United States Patent [19]

Lotsch

[11] 4,166,179

[45] Aug. 28, 1979

[54] MANUFACTURE OF ORGANIC PIGMENTS

[75] Inventor: Wolfgang Lotsch, Beindersheim, Fed. Rep. of Germany

[73] Assignee: BASF Aktiengesellschaft, Fed. Rep. of Germany

[21] Appl. No.: 797,319

[22] Filed: May 16, 1977

[30] Foreign Application Priority Data

Jun. 24, 1976 [DE] Fed. Rep. of Germany ....... 2628409

[51] Int. Cl.² .............................................. C09B 57/00
[52] U.S. Cl. ................................... 544/296; 260/42.21
[58] Field of Search .................. 260/260, 257; 544/296

[56] References Cited

U.S. PATENT DOCUMENTS 3,991,054 11/1976 Bock et al. ........................... 260/257

FOREIGN PATENT DOCUMENTS 2107064 4/1972 France .

OTHER PUBLICATIONS

Bock et al., Chemical Abstracts, vol. 77, (1972), 7430p.

Primary Examiner—Paul M. Coughlan, Jr.
Attorney, Agent, or Firm—Keil & Witherspoon

[57] ABSTRACT

A process for the manufacture of pigments of the formula

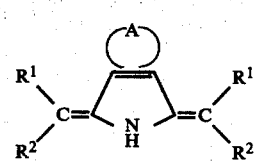

where

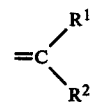

is a radical of barbituric acid or of one of its derivatives and

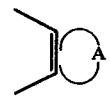

is a divalent radical of benzene, 1,2- or 2,3-naphthalene, pyridine or pyrazine, which radical may be unsubstituted or substituted by halogen, alkyl of 1 to 10 carbon atoms, phenyl, carbamoyl, alkylcarbonylamino (where alkyl is of 1 to 17 carbon atoms), benzoylamino, alkoxy of 1 to 4 carbon atoms or phenoxy, the number of substituents being 1 or 2, by condensing amino-imino compounds or bis-imino compounds of the formula

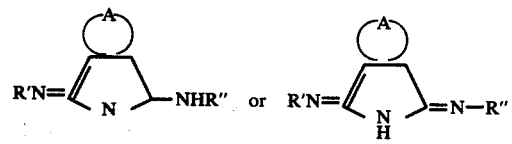

where R' and R" may be identical or different and are hydrogen, alkyl of 1 to 4 carbon atoms, hydroxyalkyl of 2 or 3 carbon atoms, phenylalkyl of 7 or 8 carbon atoms or phenyl, with barbituric acid or its derivatives, in the molar ratio of 1:2, in water in the presence of aliphatic carboxylic acids, aromatic carboxylic acids, aliphatic sulfonic acids, aromatic sulfonic acids, mineral acids or mixtures of these, at a pH of from 1 to 6, at from 20° to 150° C. The compounds I are obtained in high yield and good purity. These pigments are readily dispersed and give brilliant yellow colorations of good fastness to light and weathering.

17 Claims, No Drawings

MANUFACTURE OF ORGANIC PIGMENTS

The present invention relates to a process for the manufacture of organic pigments having substantially improved technological and tinctorial properties.

German Laid-Open Application DOS 2,041,999 discloses, inter alia, organic pigments of the general formula

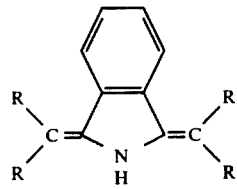

where

is the radical of barbituric acid or of one of its derivatives. These colorants are obtained in good yields and in sufficiently pure form for use as pigments when 1-amino-3-iminoisoindolenine and barbituric acid derivatives are condensed in the molar ratio of 1:2 in the presence of anhydrous carboxylic acids, eg. acetic acid or formic acid, mineral acids, eg. concentrated sulfuric acid or hydrogen chloride, or ansolvo acids, eg. anhydrous zinc chloride or boron trifluoride, and/or acylating agents, eg. acetic anhydride, benzoyl chloride or phenyl isocyanate, in the presence or absence of solvents which are inert under the reaction conditions.

However, the colorants manufactured in this way, whilst otherwise having good pigmentary properties, are very difficult to disperse. This is a great disadvantage as far as their use is concerned, since, for example, it is very difficult to incorporate the pigments into plastics, eg. polyvinyl chloride or polyethylene, or into surface coatings. Furthermore, the energy required to disperse the pigments is very great.

In addition, the anhydrous carboxylic acids and solvents required for the condensation reaction must be reprocessed, for ecological reasons, resulting in additional problems and costs.

It is an object of the present invention to provide a process by means of which colorants of the above type are obtained directly, from the synthesis reaction, in an easily dispersed form, and in which the above problems are avoided or at least diminished.

I have found that this object is achieved and that easily dispersed colorants of the formula

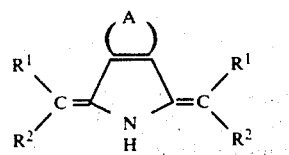

where

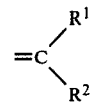

is a radical of barbituric acid or of one of its derivatives, and

is a divalent radical of benzene (i.e., o-phenylene), of 1,2- or 2,3-naphthalene (i.e., naphthylene), of pyridine or of pyrazine, these radicals being unsubstituted or substituted by halogen, alkyl of 1 to 10 carbon atoms, phenyl, carbamoyl, alkylcarbonylamino (where alkyl is of 1 to 17 carbon atoms), benzoylamino, alkoxy of 1 to 4 carbon atoms and/or phenoxy, are obtained by condensing amino-imino compounds or their tautomeric bis-imino compounds of the formula

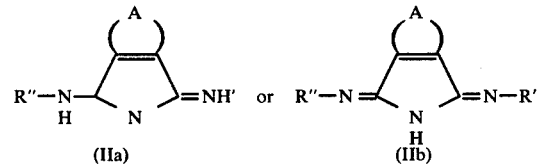

where R' and R" may be identical or different and are hydrogen, alkyl of 1 to 4 carbon atoms, hydroxyalkyl of 2 or 3 carbon atoms, phenylalkyl of 7 or 8 carbon atoms or phenyl, with barbituric acid, its derivatives or mixtures thereof, in the molar ratio of 1:2, if the condensation is carried out in water in the presence of aliphatic carboxylic acids, aromatic carboxylic acids, aliphatic sulfonic acids, aromatic sulfonic acids, mineral acids or mixtures of these, at a pH of from 1 to 6, in the presence or absence of surfactants, at from 20° to 150° C.

Suitable divalent radicals of the formula

are those of benzene (i.e., o-phenylene), of 1,2- and 2,3-naphthalene, of pyridine and of pyrazine. The radical

may be unsubstituted or substituted by halogen, eg. chlorine or bromine, alkyl of 1 to 10 carbon atoms, especially of 1 to 4 carbon atoms, eg. methyl, ethyl, isopropyl, butyl, isobutyl, sec.-butyl, tert.-butyl, amyl, hexyl or octyl, phenyl, phenoxy, carbamoyl, alkylcarbonylamino (where alkyl is of 1 to 17 carbon atoms, preferably of 1 to 3 carbon atoms), benzoylamino and- /or alkoxy of 1 to 4 carbon atoms, preferably methoxy or ethoxy. The number of substituents in the radical

is 0, 1 or 2, preferably 0 or 1.

o-Phenylene is the preferred radical of the formula

The o-phenylene may be unsubstituted or substituted by one or two chlorine, bromine and/or alkyl of 1 to 4 carbon atoms, or by one phenyl, phenoxy, carbamoyl, alkylcarbonylamino (where alkyl is of 1 to 3 carbon atoms), benzoylamino, phenoxy, methoxy or ethoxy.

Unsubstituted o-phenylene is particularly preferred as

Preferred products are those of the formula

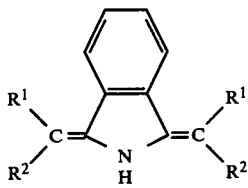

(Ia)

where $R^1$ and $R^2$ have the above meanings and the benzene nucleus (ie. the o-phenylene radical) is unsubstituted or substituted by 1 or 2, preferably 1, substituents from amongst chlorine, bromine, alkyl of 1 to 4 carbon atoms, phenyl, alkylcarbonylamino (where alkyl is of 1 to 3 carbon atoms), benzoylamino, phenoxy, methoxy and/or ethoxy.

The colorants (I) are obtained in good yields and high purity by the process of the invention. The products exhibit improved brilliance, substantially improved fastness to light and to weathering and, above all, substantially softer grains, i.e., they are substantially more easily dispersed than the colorants of the prior art. These results were unexpected. The colorants (I) are exceptionally suitable for the mass-coloring of plastics and the manufacture of printing inks and paints.

The process according to the invention is advantageously carried out by introducing the barbituric acid or its derivative into the mixture of water and acid at room temperature, at the same time producing a suspension by stirring the batch well. The 1-amino-3-iminoisoindolenine compound or its isomeric 1,3-bisimino compounds, undiluted or in the form of an organic solution, is then added gradually to the suspension, with very efficient stirring. After having added the isoindolenine, the condensation is completed by heating at temperatures above room temperature, up to 150° C. If necessary, the pH of the reaction mixture is maintained at from 1 to 6 by adding more acid. The condensation is advantageously carried out in the presence of surfactants which may be added together with the barbituric acid, combined with the mixture of water and acid and/or supplied with the starting materials IIa and/or IIb.

Suitable reactants are barbituric acid and derivatives thereof, eg. N-methylbarbituric acid, N,N'-dimethylbarbituric acid, N,N'-diphenylbarbituric acid, 2-thiobarbituric acid and 2-iminobarbituric acid. Unsubstituted barbituric acid is the preferred reactant.

The amino-imino compounds or bis-imino compounds of the formulae (IIa) and (IIb) are manufactured by conventional processes entailing adduct formation of ammonia (R' and R''=H) or of amines of the formulae R'-NH$_2$ and R''-NH$_2$ with dinitriles of the formula

(III)

In the process according to the invention, the amino-imino compounds (IIa) and the bis-imino compounds (IIb) may be used undiluted or as a solution or suspension in a water-miscible solvent. The use of solutions or suspensions of (IIa) and/or (IIb), as obtained from the manufacture of these compounds in water-miscible solvents, is preferred. If the condensation according to the invention is to be carried out in the presence of surfactants, these may be added to the solution or suspension of (IIa) and/or (IIb). For example, 1-amino-3-iminoisoindolenine is manufactured by passing ammonia into a solution or suspension of o-phthalodinitrile and the resulting solution of the isoindolenine is used for the condensation. The use of a solution obtained by reacting o-phthalodinitrile with ammonia in ethylene glycol is advantageous. The surfactants which are to be present during the reaction may be added to the solution.

In accordance with the above, examples of preferred nitriles of the formula (III) are o-phthalodinitrile, 4-chloro-o-phthalodinitrile, 4,5-dichloro-o-phthalodinitrile, 4-methyl-o-phthalodinitrile, 4,5-dimethyl-o-phthalodinitrile, 4-isopropyl-o-phthalodinitrile, 4-isobutyl-o-phthalodinitrile, 4-tert.-butyl-o-phthalodinitrile, 4-phenyl-o-phthalodinitrile, 4-phenoxy-o-phthalodinitrile, 4-bromo-o-phthalodinitrile, 4-benzoylamino-, 4-acetylamino- and 4-propionylamino-o-phthalodinitrile, 4-methoxy- and 4-ethoxy-o-phthalodinitrile, 1,2-dicyanonaphthalene, 2,3-dicyanonaphthalene, 2,3- and 3,4-bis-cyanopyridine and 2,3-bis-cyanopyrazine. Amongst these, the o-phthalodinitrile derivatives, and especially o-phthalodinitrile itself, are preferred.

Examples of suitable acids are aliphatic and aromatic carboxylic acids and/or sulfonic acids. Specific examples are formic acid, acetic acid, propionic acid, oxalic acid, succinic acid, glutaric acid, citric acid, benzoic acid, phthalic acid, salicylic acid, benzenesulfonic acid, naphthalenesulfonic acid, phenolsulfonic acid and mixtures of these.

Further suitable acids are mineral acids, eg. hydrochloric acid, sulfuric acid, phosphoric acid, sulfurous acid and mixtures of these. Mixtures of mineral acids with organic carboxylic acids and/or sulfonic acids, or mixtures of mineral acids with salts of organic carboxylic acids and/or sulfonic acids, may also be used.

The condensation is preferably carried out in the presence of the above carboxylic acids. Amongst these, the aliphatic carboxylic acids are particularly preferred. Formic acid is very particularly preferred; in its presence, a brilliant and particularly greenish yellow pigment is obtained.

As a rule, the amount of acid chosen is such that the ammonia liberated during the condensation reaction is neutralized and the pH in the reaction mixture is kept at from 1 to 6, preferably from 1.5 to 3.5, during the condensation. An excess of carboxylic acid is not detrimental. Preferably, the condensation is carried out in an aqueous solution which contains from 5 to 40% by weight, preferably from 10 to 20% by weight, based on the solution, of aliphatic carboxylic acids.

The condensation may also be carried out by adding less than the stoichiometrically required amount of acid and maintaining the pH in the reaction mixture at the desired value by continuous addition of acid, eg. of a sulfonic acid or mineral acid.

Suitable surfactants are the conventional non-ionic, cationic and anionic compounds used as dispersants, wetting agents and protective colloids. Examples of such compounds are the alkali metal salts and alkaline earth metal salts of alkylbenzenesulfonic acids, alkylphenolsulfonic acids, alkylnaphthalenesulfonic acids and partially sulfonated polystyrenes, the alkali metal salts of water-soluble condensation products of naphthalenemonosulfonic acids of their alkyl derivatives and formaldehyde, the alkali metal salts of water-soluble condensation products of phenolsulfonic acids, formaldehyde and urea, ligninsulfonates, adducts of ethylene oxide and/or propylene oxide with alkanols, alkanediols, phenols, carboxylic acids, amines and carboxylic acid amides, and water-swellable and water-soluble polymers, eg. polymers of N-vinylpyrrolidone and copolymers of water-soluble monomers, eg. N-vinylpyrrolidone, acrylamide or acrylic acid, with water-insoluble monomers, eg. acrylonitrile, methyl acrylate, vinyl acetate, vinyl chloride and styrene, and polyvinyl alcohol. Mixtures of various surfactants may also be employed.

Particularly preferred surfactants are the alkali metal salts of alkylbenzenesulfonic acids, alkylphenolsulfonic acids and alkylnaphthalenesulfonic acids, where alkyl is in each case of 3 to 15 carbon atoms, the alkali metal salts of condensation products of phenolsulfonic acids, formaldehyde and urea, and adducts of propylene oxide and ethylene oxide with ethylene glycol, 1,3-propanediol and ethylenediamine.

The amount of surfactant used may vary within wide limits. Advantageously, it is from 5 to 400, preferably from 20 to 200, percent by weight, based on the barbituric acid or barbituric acid derivative used.

By suitably choosing the reaction conditions, the condensation may be controlled so that the products obtained are directly formed, and isolated, in a very suitable form for use as a pigment.

For example, a transparent pigment of high tinctorial strength is obtained if the reaction of barbituric acid with 1-amino-3-iminoisoindolenine is first carried out at 20° C., and the condensation is then completed in the course of from 2 to 3 hours at from 90° to 95° C. A pigmentary form of particularly high tinctorial strength is obtained if the condensation is carried out in the presence of non-ionic surfactants which have been manufactured by adduct formation of propanediol with propylene oxide, followed by ethylene oxide. Preferably, the surfactant is added to the solution of the 1-amino-3-imino-isoindolenine and is introduced, together with the latter, into the barbituric acid suspension.

If the condensation is first carried out at from 25° to 35° C. and then completed by heating at from 120° to 130° C. under pressure, a pigmentary form having a high hiding power and particularly good fastness properties is obtained. It has a more reddish hue than the above pigmentary form.

Further details of the invention may be found in the Examples, where parts and percentages are by weight.

EXAMPLE 1

12.8 parts of o-phthalodinitrile are suspended in 100 parts of ethylene glycol and 3 parts of ammonia gas are passed in over 3 hours at 50° C. The resulting solution of the 1-amino-3-iminoisoindolenine is added dropwise, in the course of half an hour, at room temperature, to a vigorously stirred suspension containing 27 parts of barbituric acid in a solution of 22 parts of the sodium salt of a mixture of alkylnaphthalenesulfonic acids, where alkyl is of 3 or 4 carbon atoms, and 22 parts of formic acid in 240 parts of water. The batch is stirred for one hour and is then boiled for 4 hours. Thereafter it is filtered hot and the filter residue is washed with warm water until neutral and free from residual assistant. Alternatively, the filter residue is reintroduced into water and the suspension is boiled briefly and again filtered hot, so as to remove the excess acid and the assistant rapidly and quantitatively from the pigment. The filter residue is then washed with methanol and dried.

32.5 parts of a yellow pigment which gives brilliant deep greenish yellow colorations are obtained. The product is substantially more easily dispersed than that obtained by the method of German Laid-Open Application DOS No. 2,041,999, Example 1. The colorations are more brilliant, greener and substantially deeper than those obtained with the pigment of the prior art.

EXAMPLE 2

The procedure described in Example 1 is followed, but instead of the sodium salt of a mixture of alkylnaphthalenesulfonic acids, where alkyl is of 3 or 4 carbon atoms, an equal amount of the sodium salt of a condensation product of phenolsulfonic acid, formaldehyde and urea is used. 37 parts of a yellow pigment are obtained. This product gives substantially more brilliant and greener colorations than the pigment obtained by the method described in Example 1 of German Laid-Open Application DOS No. 2,041,999. Furthermore, the new product is substantially more easily dispersed.

EXAMPLE 3

The procedure described in Example 1 is followed, but before the introduction of ammonia 3 parts of an adduct of ethylene oxide and propylene oxide with propanediol (molecular weight 3,000) are added to the ethylene glycol. 32 parts of a yellow pigment are obtained. This pigment gives substantially more brilliant, greener and deeper colorations than the product obtained by the method described in Example 3 of German Laid-Open Application DOS No. 2,041,999. The new product is substantially more easily dispersed than the product of the prior art.

EXAMPLE 4

The procedure described in Example 1 is followed, but the reaction mixture is boiled for 24 hours. 30 parts of a yellow pigment are obtained. This product gives substantially more brilliant and more reddish yellow colorations, which furthermore are substantially faster to light and weathering, then the pigment obtained by the method described in Example 3 of German Laid-Open Application DOS No. 2,041,999. The new product is substantially more easily dispersed than the product of the prior art.

EXAMPLE 5

The procedure described in Example 1 is followed, but the mixture is refluxed for 3 hours and is then heated for 3 hours at 130° C. under pressure. 29 parts of a yellow pigment are obtained. This pigment is substantially redder and more easily dispersed than the pigment obtained by the method described in Example 1 of German Laid-Open Application DOS No. 2,041,999, and also is substantially faster and its hiding power is from 3 to 4 times as great.

EXAMPLE 6

The procedure described in Example 1 is followed, but 260 parts of water are used as the reaction medium and the pH is kept at from 2 to 2.5 by dropwise addition of concentrated hydrochloric acid during the condensation. 30 parts of a yellow pigment are obtained. This pigment is substantially more easily dispersed than the pigment obtained by the method described in Example 3 of German Laid-Open Application DOS No. 2,041,999 and gives more greenish and more brilliant colorations than the pigment of the prior art.

EXAMPLE 7

The procedure described in Example 1 is followed, but instead of 22 parts of formic acid a mixture of 10 parts of formic acid and 10 parts of a technical mixture of succinic acid, glutaric acid and adipic acid, in the ratio of 20:50:30, are used. 31 parts of a yellow pigment, which is substantially more easily dispersed than the pigment obtained by the method described in Example 3 of German Laid-Open Application DOS No. 2,041,999, are obtained. The new product produces more brilliant, greener and deeper colorations in surface coatings than does the pigment of the prior art.

EXAMPLE 8

The procedure described in Example 4 is followed, but a mixture of 22 parts of formic acid and 240 parts of water is used as the reaction medium. 29 parts of a yellow pigment which is substantially more easily dispersed than the pigment obtained by the method described in Example 3 of German Laid-Open Application DOS No. 2,041,999 are obtained. In surface coatings, the new product gives colorations which are more brilliant, redder and substantially faster to light and weathering than the colorations obtained with the pigment of the prior art.

EXAMPLE 9

The procedure described in Example 1 is followed, but instead of 27 parts of barbituric acid, 32 parts of 2-thiobarbituric acid are used. 46 parts of a red pigment are obtained. This is substantially more easily dispersed than the pigment obtained by the method described in Example 4 of German Laid-Open Application DOS No. 2,041,999.

EXAMPLE 10

The procedure described in Example 1 is followed, but instead of barbituric acid, 35 parts of N,N'-dimethylbarbituric acid are used. 32 parts of a yellow pigment which has a high tinctorial strength and gives very fast colorations are obtained.

EXAMPLE 11

12.8 parts of o-phthalodinitrile are suspended in 50 parts of ethylene glycol and 50 parts of methanol and ammonia gas is passed in for 3 hours at 60° C. 27 parts of barbituric acid, 22 parts of the sodium salt of a mixture of alkylnaphthalenesulfonic acids, where alkyl is of 3 or 4 carbon atoms, and 240 parts of water are added successively to the resulting solution of 1-amino-3-iminoisoindolenine, with vigorous stirring, and the pH of the suspension is then kept at from 2 to 4 by adding formic acid. The reaction has ended when the pH no longer alters. Stirring is then continued for half an hour, after which the procedure described in Example 1 is followed.

32 parts of a yellow pigment, which is more easily dispersed and gives more brilliant colorations than the pigment obtained by the method described in German Laid-Open Application DOS No. 2,041,999, are obtained.

EXAMPLE 12

27 parts of barbituric acid and 10 parts of the adduct specified in Example 3 are added to 21 parts of 1-amino-2-iminoisoindolenine nitrate in 240 parts of water, and 10 parts of 50% strength sodium hydroxide solution are then added at from 20° to 25° C. The pH is brought to 2–3, whilst stirring vigorously, and is kept at this value, by means of formic acid. After stirring for half an hour, the mixture is heated to the boil, after which the procedure described in Example 1 is followed.

29.5 parts of a yellow pigment are obtained. This gives more greenish and more brilliant colorations than the pigment obtained by the method described in Example 3 of German Laid-Open Application DOS No. 2,041,999.

EXAMPLE 13

The procedure described in Example 11 is followed, but the initial mixture contains 35 parts of sodium formate in addition to the barbituric acid and assistant. The pH is then brought to 2–4 with 5% strength sulfuric acid after which the mixture is stirred at room temperature for half an hour and then heated to the boil. Thereafter the procedure described in Example 1 is followed.

31 parts of a yellow pigment are obtained. This pigment gives more greenish and more brilliant colorations than the pigment obtained by the method described in Example 1 of German Laid-Open Application DOS No. 2,041,999.

EXAMPLE 14

The procedure described in Example 1 is followed, but a mixture of barbituric acid and N-methylbarbituric acid in the molar ratio of 1:1 is used.

32 parts of a pigment, which gives particularly greenish and deep colorations, having good fastness properties, are obtained.

EXAMPLE 15

The procedure described in Example 5 is followed, but 32 parts of sodium barbiturate are used.

28 parts of a yellow pigment which gives very reddish colorations of good hiding power are obtained.

EXAMPLE 16

The procedure described in Example 1 is followed, but instead of o-phthalodinitrile, 18 parts of naphthalene-2,3-dinitrile are used.

32 parts of an easily dispersed yellow pigment having good fastness properties are obtained.

EXAMPLE 17

The procedure described in Example 1 is followed, but instead of o-phthalodinitrile, 21 parts of 4-phenyl-o-phthalodinitrile are used.

32 parts of an easily dispersed yellow pigment, which gives colorations with good fastness properties, are obtained.

EXAMPLE 18

The procedure described in Example 1 is followed, but instead of ammonia 5 parts of methylamine are used.

31 parts of an easily dispersed yellow pigment, which gives brilliant colorations having good fastness properties, are obtained.

EXAMPLE 19

The procedure described in Example 1 is followed, but the dinitrile is reacted with 15 parts of ethanolamine for 3 hours at 110° C. The resulting solution is reacted with barbituric acid by the method described in Example 1.

An easily dispersed yellow pigment, which gives brilliant colorations having good fastness properties, is obtained.

EXAMPLE 20

The procedure described in Example 19 is followed, but instead of ethanolamine, 20 parts of aniline are used.

An easily dispersed yellow pigment, which gives brilliant colorations having good fastness properties, is obtained.

I claim:

1. A process for the manufacture of an easily dispersed colorant of the formula

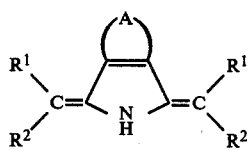

wherein:

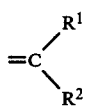

is the radical of barbituric acid, N-methylbarbituric acid, N,N'-dimethylbarbituric acid, N,N'-diphenylbarbituric acid, 2-thiobarbituric acid or 2-iminobarbituric acid; and

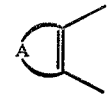

is o-phenylene, 1,2- or 2,3-naphthylene, or the divalent radical of pyridine or pyrazine, and is unsubstituted or substituted by chlorine, bromine, alkyl of 1 to 4 carbon atoms, phenyl, phenoxy, carbamoyl, alkylcarbonylamino where alkyl is of 1 to 3 carbon atoms, benzoylamino, methoxy or ethoxy, the number of substituents being 0, 1 or 2; which process comprises:

condensing (A) an amino-imino compound of the formula

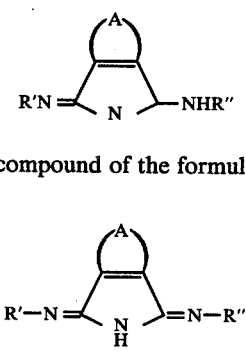

or a bis-imino compound of the formula wherein R' and R" each is hydrogen, alkyl of 1 to 4 carbon atoms, hydroxyalkyl of 2 or 3 carbon atoms, phenylalkyl of 7 or 8 carbon atoms or phenyl, with (B) barbituric acid, N-methylbarbituric acid, N,N'-dimethylbarbituric acid, N,N'-diphenylbarbituric acid, 2-thiobarbituric acid or 2-iminobarbituric acid, in the molar ratio of (A):(B) of 1:2, in water and in the presence of an acid selected from the group consisting of aliphatic carboxylic acids, aromatic carboxylic acids, aliphatic sulfonic acids, aromatic sulfonic acids, mineral acids and mixtures thereof, at a pH of from 1 to 6 and at a temperature of from 20° to 150° C.

2. A process as claimed in claim 1, in which the condensation is carried out in the presence of a surfactant.

3. A process as claimed in claim 2, in which the condensation is carried out in the presence of an aliphatic carboxylic acid.

4. A process as claimed in claim 2, in which the condensation is carried out in the presence of formic acid.

5. A process as claimed in claim 2, in which the condensation is carried out at a pH of from 1.5 to 3.5.

6. A process as claimed in claim 3, in which the condensation is carried out at a pH of from 1.5 to 3.5

7. A process as claimed in claim 2, in which the surfactants used are the alkali metal salts of sulfonic acids derived from alkylbenzenes where alkyl is of 3 to 15 carbon atoms, alkylnaphthalenes where alkyl is of 3 to 15 carbon atoms or alkylphenols where alkyl is of 3 to 15 carbon atoms or of condensation products of phenolsulfonic acids with formaldehyde and urea.

8. A process as claimed in claim 2, in which the surfactants used are adducts obtained by the reaction of propylene oxide with ethylene glycol, propylene glycol or ethylenediamine, followed by reaction of the products with ethylene oxide.

9. A process as claimed in claim 3, in which the surfactants used are adducts obtained by the reaction of propylene oxide with ethylene glycol, propylene glycol or ethylenediamine, followed by reaction of the products with ethylene oxide.

10. A process as claimed in claim 1 wherein the reactant (B) is barbituric acid.

11. A process for the manufacture of an easily dispersed colorant of the formula

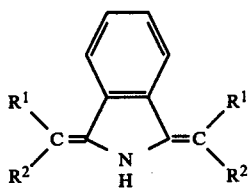

wherein:

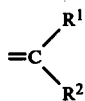

is a radical of barbituric acid, N-methylbarbituric acid, N,N'-dimethylbarbituric acid, N,N'-diphenylbarbituric acid, 2-thiobarbituric acid or 2-iminobarbituric acid; and the o-phenylene radical is unsubstituted or substituted by chlorine, bromine, alkyl of 1 to 4 carbon atoms, phenyl, alkylcarbonylamino where alkyl is of 1 to 3 carbon atoms, benzoylamino, phenoxy, methoxy or ethoxy, the number of substituents being not more than 2; which process comprises:

condensing (A) a compound of the formula

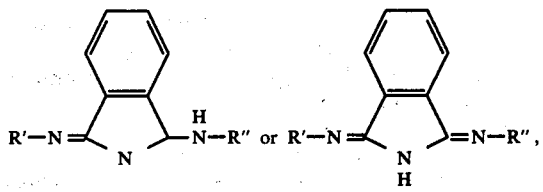

wherein R' and R" each is hydrogen, alkyl of 1 to 4 cabon atoms, hydroxyalkyl of 2 or 3 carbon atoms, phenylalkyl of 7 or 8 carbon atoms or phenyl, with (B) barbituric acid, N-methylbarbituric acid, N,N'-dimethylbarbituric acid, N,N'-diphenylbarbituric acid, 2-thiobarbituric acid or 2-iminobarbituric acid, in the molar ratio of (A):(B) of 1:2, in water and in the presence of an acid selected from the group consisting of aliphatic carboxylic acids, aromatic carboxylic acids, aliphatic sulfonic acids, aromatic sulfonic acids, mineral acids and mixtures thereof, at a pH of from 1 to 6 and at a temperature from 20° to 150° C.

12. A process as claimed in claim 11, in which the condensation is carried out in the presence of an aliphatic carboxylic acid.

13. A process as claimed in claim 11, in which the condensation is carried out in the presence of formic acid at a pH of from 1.5 to 3.5.

14. A process as claimed in claim 11, in which the condensation is carried out in the presence of surfactants which may be alkali metal salts of sulfonic acids derived from alkylbenzenes where alkyl is of 3 to 15 carbon atoms, alkylnaphthalenes where alkyl is of 3 to 15 carbon atoms or alkylphenols where alkyl is of 3 to 15 carbon atoms or of condensation products of phenolsulfonic acid with formaldehyde and urea, or adducts obtained by reaction of propylene oxide with ethylene glycol, propylene glycol or ethylenediamine, followed by reaction of ethylene oxide with the products.

15. A process as claimed in claim 12, in which the condensation is carried out in an aqueous aliphatic carboxylic acid solution which contains from 5 to 40% by weight, based on the solution, of carboxylic acid.

16. A process as claimed in claim 12, in which the condensation is carried out in an aqueous aliphatic carboxylic acid solution which contains from 10 to 20% by weight, based on the soluton, of carboxylic acid.

17. A process as claimed in claim 11 wherein the reactant (B) is barbituric acid.

* * * * *

UNITED STATES PATENT AND TRADEMARK OFFICE
CERTIFICATE OF CORRECTION

PATENT NO. : 4,166,179
DATED : August 28, 1979
INVENTOR(S) : Wolfgang LOTSCH

It is certified that error appears in the above—identified patent and that said Letters Patent is hereby corrected as shown below:

In the Abstract, line 17, the formulas appearing therein should be corrected to read as follows:

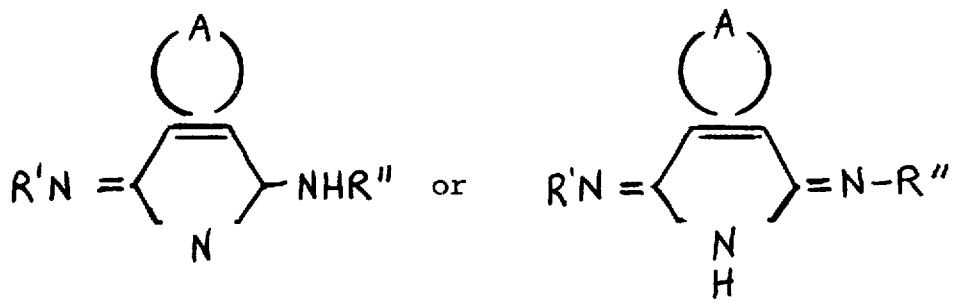

Signed and Sealed this

Fifteenth Day of April 1980

[SEAL]

Attest:

Attesting Officer

SIDNEY A. DIAMOND

Commissioner of Patents and Trademarks